United States Patent Office 2,797,165
Patented June 25, 1957

2,797,165
REMOVING COOKED TISSUE FROM PEELED POTATOES

Winfred O. Harrington, Berkeley, Calif., assignor to the United States of America as represented by the Secretary of Agriculture No Drawing. Application December 21, 1954, Serial No. 476,857

5 Claims. (Cl. 99—154)

(Granted under Title 35, U. S. Code (1952), sec. 266)

A non-exclusive, irrevocable, royalty-free license in the invention herein described, for all governmental purposes, throughout the world, with the power to grant sublicenses for such purposes, is hereby granted to the Government of the United States of America.

This invention concerns the processing and preservation of potatoes and particularly relates to operations applied to potatoes prior to preservation, these operations being for the purpose of removing the skins and removing surface layers of tissue which are deleterious to the quality of the potatoes. A specific object of the invention is the provision of processes wherein raw peeled potatoes are subjected to a lye treatment to remove surface tissue damaged during the peeling operation. By this procedure, peeled potatoes of exceptional keeping and cooking qualities are produced. Further objects and advantages of the invention will be obvious from the description herein.

A recent development in the food industry is the production of pre-peeled fresh potatoes. The process as generally carried out involves the following steps:

Raw potatoes are peeled and washed, dipped in a sulphiting bath, packaged in waxed-paper bags and kept under refrigeration (about 40° F.) until used. Such products serve as a convenient source of potatoes and are widely used by restaurants, hospitals, and other large users of potatoes. The products are not designed to last indefinitely but are to be used in about 5 to 10 days after preparation. Oftentimes the potatoes are cut into slices to serve as a source material for making French-fried potatoes.

In the production of such products, various methods of peeling have been investigated. Abrasion peeling is not commonly used because it results in large losses of edible potato substance. Lye peeling is quite commonly employed as giving good removal of peel with a reasonably low loss of edible material. In general this type of peeling involves dropping the raw potatoes into a tank of lye solution containing about 10 to 40%, usually 15-18%, of sodium hydroxide. The potatoes are moved about in the tank to get good contact with the solution. The temperature of the lye bath is generally about 140-218° F. and the potatoes are kept therein until the skins are loosened. This requires about one to 10 minutes depending on the temperature, the higher temperature causing more rapid loosening of the skins. The potatoes are then removed from the lye and subjected to sprays of water which wash off the loosened skins and remove all traces of lye from the tubers.

One problem in the lye peeling process is that oftentimes a layer of edible tissue just under the peel is altered in a physical and chemical sense as a result of the heating action of the lye solution. This altered tissue is not removed when the lye-treated potatoes are subjected to sprays of water in the washing operation. As a consequence, the peeled potatoes have a surface layer, which may be continuous or spotty, consisting of what may be termed tissue in a cooked condition. The presence of this cooked layer of tissue is of no consequence if the potatoes are to be processed immediately, for example if they are cooked for immediate consumption or if they are processed as dehydrated potatoes. However, if the potatoes are to be preserved in the fresh state the cooked layer brings about serious disadvantages. Thus potatoes having such cooked layers are susceptible to bacterial spoilage, discoloration, and development of toughness when the tubers are sulphited and stored under refrigeration in the usual way. Thus it has been observed that when (a) tubers having a surface of normal, raw tissue and (b) tubers containing surface areas of cooked tissue are sulphited and stored under the same conditions (about 40° F.) for the same period of time, those tubers (a) which are free of cooked surface areas remain free from discoloration and bacterial spoilage and on cooking the potatoes exhibit the same degree of tenderness in surface layers as in deeper layers of tissue. On the other hand those tubers with (b) cooked surface areas exhibit considerable bacterial spoilage and discoloration in the tissue beneath the cooked layer. Further, when these tubers are cooked, the outer layers become tough, in extreme cases the surface layers forming a tough crust like the peel on an orange.

The cooked tissue on the surface of the peeled potatoes can be detected by inspection and examination. Thus the cooked tissue has an off-white or cream color and is more opaque than the raw tissue. In addition when the cooked tissue is pressed with an instrument such as a fork, no juice will exude therefrom as it will in the case of raw tissue. In a chemical sense, the starch in the cooked tissue has been gelatinized whereas in the raw tissue the starch is in its native or ungelatinized state. Chemical tests based on this difference in the condition of the starch may be used to accurately determine the extent of tissue alteration.

Efforts have been made to eliminate the formation of the cooked tissue layer by using a lower temperature in the lye peeling bath, that is, about 120–160° F. instead of the usual 210° F. This technique has given some measure of success but is not applicable to all varieties of potatoes. For example it has been observed with White Rose potatoes, especially those which had been stored for several weeks, that the skins showed a considerable resistance to the low temperature lye treatment. The net result was that the lye treatment had to be extended for such a long period of time to loosen the skins that the surface layers of the edible part of the tubers were considerably cooked. It is thus evident that a mere reduction in the temperature of the lye peeling treatment does not completely solve the problem of how to prevent the formation of the cooked layer.

We have now found that the problem of the cooked surface layer can be eliminated in a simple and expeditious manner by subjecting the peeled potatoes to a lye treatment whereby the cooked surface layers are removed. Briefly described, the process of this invention involves subjecting the peeled potatoes to lye and heat under controlled conditions of time and temperature. The result of this treatment is that the cooked tissue on the surface of the potatoes is softened so that it can be readily removed by spraying with water, brushing, or the like. The invention is explained more fully as follows:

In applying this invention raw unpeeled potatoes are first subjected to a conventional peeling operation. This peeling step may be lye peeling as outlined above. Other peeling techniques such as application of steam, flame, or hot acid solutions may be employed, all as well known in the art. It is evident that in any peeling operation wherein heat is involved the edible potato tissue may develop a cooked surface, the extent and depth of the cooked tissue layer being dependent on the severity of the heat treatment during peeling.

After immersion in the lye solution, or after other treatment applied to loosen the skins, the potatoes are thoroughly washed preferably with sprays of water to slough off the loosened skins.

The peeled potatoes are then immersed in a lye solution, the potatoes being moved about to achieve good contact with the liquid. The solution may contain about 10 to 40% sodium hydroxide, usually about 17% of NaOH is used. Such a solution contains sufficient alkali to have rapid softening action yet its viscosity is low enough so that it can be heated rapidly and can be kept agitated without excessive power consumption. The lye solution is maintained in the range about from 70 to 130° F., preferably about 120° F. Temperatures in this range will not cause any heat damage to the normal potato tissue in the short retention time involved. The potatoes are left in the lye until the cooked layer is loosened or softened so that it can be removed easily. The proper time for removal of the potatoes from the bath can be ascertained in this manner: The operator may remove a potato from the bath from time to time and note whether the cooked layer can be disengaged with pressure from the finger tip or finger nail. (Note: protective rubber gloves are used.) When such a point is reached the potatoes are removed from the lye. The time of retention in the bath will vary to some extent on the depth of the cooked tissue layer but more on the temperature of the lye bath, higher temperatures causing more rapid loosening of the cooked tissue layer and vice versa. Usually the potatoes are kept in the lye bath for about one to 10 minutes. The potatoes are then removed from the lye bath and thoroughly washed, preferably with sprays of water, to remove the surface tissue softened by the lye treatment and all traces of the lye itself.

The subjection of peeled potatoes to lye and heat will, as above described, soften cooked tissue on the surface of the tubers so that this cooked tissue can be easily removed by washing, brushing, etc. It should be noted that the treatment is potentially capable of softening normal raw tissue as well as cooked tissue. Therefore in practice of the invention, the conditions of treatment are so regulated that the cooked tissue is softened whereas normal raw tissue is not softened to substantial extent. The softening action of the lye treatment is primarily dependent on time and temperature so that the higher the temperature of the lye bath or the longer the retention time in the bath the greater will be the depth of softening from the exterior of the tubers toward the center of the tubers. In regulating the process to obtain softening of the cooked tissue with the least possible damage to normal tissue, it is generally preferred to select a temperature for the lye treatment within the range set forth above. The peeled potatoes are then placed in the lye bath and the tubers are inspected from time to time by digital manipulation or observation. When the tubers have been in the bath long enough that cooked tissue layers are softened, the tubers are removed and subjected to washing. In many cases, it is preferred to leave the tubers in the lye bath for a sufficient time to soften not only the cooked tissue layer but also a thin, superficial layer of normal raw tissue. When the treated tubers are washed, they will have a smooth, clean surface completely free from cooked tissue, scabs, blemishes and other surface defects.

In an alternative method of carrying out the process of this invention the peeled potatoes are immersed in a bath of lye maintained at about room temperature. The potatoes are held in the lye bath until the lye solution penetrates into the layer of cooked tissue—this requires only a few minutes, usually about 1 to 5 minutes. The potatoes are then removed from the lye bath and placed in a bath of plain hot water so that the lye-penetrated cooked tissue layer is softened and rendered easily removable by water sprays, brushing, or the like. The hot water bath is maintained at about 120–130° F. and the potatoes are retained therein until manual testing indicates that the cooked tissue layer is readily removable—this will usually be in a few minutes, on the order of 1 to 5 minutes. The potatoes are then removed from the hot water bath and subjected to sprays of water to remove softened tissue and residual lye. In this modification, the penetration of lye solution at normal temperatures causes a certain degree of softening of the cooked tissue layer and the heat applied through the medium of the hot water bath further softens the lye-treated tissue so that it is readily removable by the water sprays. The alternative procedure described above can be modified in that after the peeled potatoes are subjected to lye treatment at about room temperature, they may be subjected to sprays of hot water (about 120–130° F.) whereby to cause softening of the lye-penetrated cooked tissue and sloughing off of the softening tissue by the mechanical action of the sprays.

For preservation in the fresh state, the potatoes, after peeling and subsequent lye-treatment as above described, are immersed in a bath of an enzyme-inactivator usually a sulphiting agent, that is, sodium sulphite, sodium bisulphite or sulphurous acid. Often citric acid is also used in conjunction with the sulphiting agent. Generally a solution containing about 0.2 to 2% of sodium bisulphite is used and the potatoes are left therein from about 30 seconds at the higher concentration to about 3 minutes at the lower concentration. The sulphited potatoes are then packaged in suitable containers such as bags made of waxed paper, cellophane, cellulose acetate, etc. and stored under cold storage conditions of refrigeration (about 35–45° F.) until used. Under such conditions the products will keep for a maximum of about 10 days. Where the products are meant to be kept for longer periods of time the concentration of sulphite and/or time in the sulphiting bath may be increased to give a greater preservative effect. It is obvious that, if desired, the potatoes may be sliced to adapt them as a stock for preparing French-fried potatoes.

It has been found that subjection of the peeled potatoes to the lye solution does not adversely affect the quality nor the food value of the potatoes. The treated potatoes exhibit the same cooking qualities as knife-peeled potatoes and after cooking the treated potatoes are equal in taste and food value to cooked knife-peeled potatoes. The lye does not penetrate into the potato tissue beyond the point where the tissue is softened and removed by washing. This has been determined by applying phenolphthalein to the potatoes after the lye treatment and washing and it was observed that this sensitive indicator developed no color as it would if any of the basic material were present.

Another advantage of the lye treatment in accordance with this invention is that in addition to removing layers of cooked tissue the lye treatment causes removal of other undesirable material such as pieces of skin, scabs, blemishes, etc. not removed in the peeling operation.

The invention is further demonstrated by the following examples.

*Example 1*

A. *Peeling.*—A lot of White Rose potatoes (raw, unpeeled) was immersed in a tank containing lye solution (17% NaOH) maintained at 160° F. The potatoes were agitated in the bath for 4 minutes then removed and washed with sprays of water. It was observed that the tubers had pieces of skin left on. The peeled surface of the tubers was covered with a cooked tissue layer which was thickest at the ends of the potatoes.

B. *Treatment to remove cooked tissue.*—Half of the peeled potatoes were immersed in a bath of lye (17% NaOH) maintained at 120° F. The tubers were agitated in the bath for 3 minutes then removed and washed thoroughly with sprays of water. It was observed that the tubers were now clean and the surface was free from cooked tissue.

The potatoes which had been peeled only (part A) and those which had received the second lye treatment (part B) were separately given a 2-minute dip in a 0.5% solution of sodium bisulphite. The separate products were packaged in cellophane bags and stored at 37° F. for 11 days. At the end of this time the products were examined and cooked by boiling in water. The results are tabulated below:

|  | Sample A (peeled only) | Sample B (peeled then given lye treatment) |
|---|---|---|
| Appearance | Moist, gray discoloration. | Dry, no discoloration. |
| Biological conditions | Visible bacterial growth. | No visible bacterial growth. |
| Odor | Foul | Clean odor. |
| Texture after cooking | Surface of cooked potatoes was hard, inner tissue tender. | Texture of cooked potatoes was uniform and tender. |

*Example II*

The experiment of Example I was repeated with the following changes:

(A) Immersion of the raw potatoes in the lye-peeling bath (part A) was for a period of 10 minutes.

(B) Immersion of half the peeled potatoes in the second lye solution was 10 minutes at 68° F.

The products after sulphiting were stored at 37° F. for 14 days.

The results obtained are tabulated below:

|  | Sample A (peeled only) | Sample B (peeled then given lye treatment) |
|---|---|---|
| Appearance | Moist, gray discoloration | Dry, natural color. |
| Biological condition | Slimy with bacterial growth. | No visible bacterial growth. |
| Odor | Putrid | Pleasant and clean. |
| Texture after cooking | Surface of cooked potatoes was tough and leathery. | Texture of cooked potatoes was uniformly tender throughout. |

*Example III*

A batch of raw, unpeeled potatoes was agitated for 1 minute in a bath of lye (15% NaOH) maintained at 210° F. The potatoes were then removed from the bath and washed with sprays of water to remove loosened skin. It was observed that the tubers had some blemishes and eyes remaining and the peeled surface was covered with a layer of cooked tissue.

The potatoes, peeled as above described, were agitated for 2 minutes in a bath of lye (15% NaOH) maintained at 75° F. The potatoes were then removed from the lye bath and agitated in a bath of hot water (120° F.) for 2 minutes. The potatoes were then removed from the hot water bath and washed thoroughly with sprays of water. It was observed that the tubers had a clean appearance being free from all eyes and blemishes and there was no cooked tissue remaining on the surface of the potatoes.

Having thus described the invention, what is claimed is:

1. A method for removing layers of cooked tissue from the surface of peeled potatoes which comprises immersing the peeled potatoes in a lye solution containing from 10 to 40% sodium hydroxide at a temperature about from 70 to 130° F. for a period of time, sufficient to loosen the cooked tissue layers, within the range from about 1 to about 10 minutes, removing the potatoes from the lye solution, and washing them to remove loosened tissue and residual lye.

2. The process of claim 1 wherein the lye solution contains about 17% sodium hydroxide and is maintained at about 120° F.

3. In the process of preserving fresh potatoes wherein raw potatoes are peeled with the application of heat and the peeled, raw potatoes are treated with an enzyme inactivator and stored under refrigeration, the improvement to enhance the keeping and cooking qualities of the product which comprises immersing the peeled potatoes in a lye solution containing about from 10 to 40% sodium hydroxide at a temperature about from 70 to 130° F. for a period of time, sufficient to soften heat-modified surface tissue layers, within the range from about 1 to about 10 minutes, removing the potatoes from the lye solution, washing them to remove softened tissue and residual lye, and thereafter applying the enzyme-inactivator to the potatoes and storing them under refrigeration.

4. The process of claim 3 wherein the lye solution contains about 17% sodium hydroxide and is maintained at a temperature of about 120° F.

5. A method of removing layers of cooked tissue from the surface of peeled potatoes which comprises immersing the peeled potatoes in a lye solution containing about from 10 to 40% sodium hydroxide maintained at about room temperature, the potatoes being retained therein for a period of time, long enough to cause penetration of the lye into the cooked tissue layers, within the range from about 1 to about 5 minutes, thereafter removing the potatoes from the lye solution, immersing them in hot water at a temperature of about from 120 to 130° F. for a period of time, sufficient to cause softening of the lye-penetrated tissue, within the range from about 1 to about 5 minutes, and then washing the so-treated potatoes.

References Cited in the file of this patent

UNITED STATES PATENTS

| 2,417,933 | Kalmar | Mar. 25, 1947 |
| 2,506,793 | Kalmar et al. | May 9, 1950 |